(12) United States Patent
Tiwari et al.

(10) Patent No.: US 12,111,718 B2
(45) Date of Patent: Oct. 8, 2024

(54) RECONSTRUCTING EXECUTION CALL FLOWS TO DETECT ANOMALIES

(71) Applicant: Citrix Systems, Inc., Fort Lauderdale, FL (US)

(72) Inventors: Satyendra Tiwari, San Jose, CA (US); Nikolaos Georgakopoulos, Patras (GR); Utkarsh Agarwal, Bengaluru (IN); Pavan Belani, Bengaluru (IN); Srinivas Reddy Kasu, Banglore (IN); Rahul Kumar, Bengaluru (IN)

(*) Notice: Subject to any disclaimer, the term of this patent is extended or adjusted under 35 U.S.C. 154(b) by 0 days.

(21) Appl. No.: 17/373,107

(22) Filed: Jul. 12, 2021

(65) Prior Publication Data
US 2022/0382617 A1  Dec. 1, 2022

Related U.S. Application Data

(63) Continuation of application No. PCT/GR2021/000034, filed on May 26, 2021.

(51) Int. Cl.
*G06F 11/00* (2006.01)
*G06F 11/07* (2006.01)
*G06F 16/28* (2019.01)

(52) U.S. Cl.
CPC ...... *G06F 11/0751* (2013.01); *G06F 11/0721* (2013.01); *G06F 16/285* (2019.01)

(58) Field of Classification Search
CPC ............. G06F 11/0751; G06F 11/0721; G06F 11/076; G06F 11/0754; G06F 11/0706; G06F 11/0703; G06F 11/0709; G06F 11/0784
See application file for complete search history.

(56) References Cited

U.S. PATENT DOCUMENTS

| | | | | |
|---|---|---|---|---|
| 10,095,774 | B1* | 10/2018 | Soceanu | G06N 20/00 |
| 2004/0230623 | A1* | 11/2004 | D'Angelo | G06F 16/20 |
| 2018/0114126 | A1 | 4/2018 | Das et al. | |
| 2020/0336502 | A1* | 10/2020 | Xu | G06F 11/076 |
| 2021/0266358 | A1* | 8/2021 | Cady | H04L 67/1008 |
| 2022/0083568 | A1* | 3/2022 | Bianchini | G06Q 10/10 |

FOREIGN PATENT DOCUMENTS

WO   WO 2003007540 A1 *   1/2003

OTHER PUBLICATIONS

International Search Report and Written Opinion on PCT Appl. No. PCT/GR2021/000034 mailed Jan. 31, 2022.

* cited by examiner

*Primary Examiner* — Katherine Lin

(57) ABSTRACT

Systems and methods of reconstructing execution call flows to detect anomalies are provided. A device can establish call flows using information extracted from a log file. Each of the call flows can identify information from the log file of a call flowing through a plurality of modules. The device can identify a count of a number of occurrences of one or more keywords in information of each call flow. The device can generate a vector of numbers for each call flow based at least on the count for the one or more keywords for that call flow. The device can classify each call flow into one or more clusters that indicate whether an operation of the call flow is anomalous. The device can classify each call flow using the vector of numbers for each call flow.

17 Claims, 11 Drawing Sheets

RECONSTRUCTING EXECUTION CALL FLOWS TO DETECT ANOMALIES

CROSS-REFERENCE TO RELATED APPLICATION

This application is a continuation of and claims priority to International Application No. PCT/GR2021/000034, titled "RECONSTRUCTING EXECUTION CALL FLOWS TO DETECT ANOMALIES," and filed on May 26, 2021, the contents of all of which are hereby incorporated herein by reference in its entirety for all purposes.

BACKGROUND

In network environments, a device can route packets between client devices and servers to allow the client devices to access resources or services provided by the servers, which can be hosted in a data center or cloud computing environment. The services or applications provided by the servers can generate logs that indicate status or error information associated with the execution of the application. However, due to the variety of types of applications and other components in the cloud computing environment, it can be challenging to identify an error and resolve the error in an efficient and reliable manner without causing excessive server downtime or latency in the network.

SUMMARY

This technical solution is directed towards systems and methods of reconstructing execution call flows to detect anomalies. For example, applications hosted or provided by a cloud service can generate a log. The log can be used to troubleshoot and identify any issues with modules of the application or microservices associated with the application. This technical solution can obtain the logs from multiple modules or components, and piece the logs together to reconstruct the call flow. The technical solution can identify an outlier call flow from the reconstructed call flows. In some cases, the technical solution can depict the execution call flow using a service graph, and highlight the outliers in the edges.

To do so, the technical solution can reconstruct the call flow from the logs using a transaction identifier, time stamp, and module or pod information. The technical solution can transform keywords such as error, response, status, pod name, or method into a numerical vector based on a count of the number of occurrences of each keyword. The technical solution can classify this numerical vector to identify an outlier call flow.

At least one aspect is directed to a method of identifying anomalous calls flowing through modules. The method can be performed by a device having one or more processors and memory. The method can include the device establishing a plurality of call flows. The device can use information extracted from a log file to establish the plurality of call flows. Each of the plurality of call flows can identify information from the log file of a call flowing through a plurality of modules. The method can include the device identifying a count of a number of occurrences of one or more keywords in information of each call flow of the plurality of call flows. The method can include the device generating a vector of numbers for each call flow based at least on the count for the one or more keywords for that call flow. The method can include the device classifying each call flow into one or more clusters that indicate whether an operation of the call flow is anomalous. The device can classify each call flow using the vector of numbers for each call flow.

In implementations, the method can include the device extracting information from the log file for each call flow based at least on a transaction identifier and timestamps. In implementations, the method can include the device sorting identifiers of modules for each call flow by the timestamps for each transaction identifier. In implementations, the method can include the device converting alpha numeric data from the extracted information for each call flow to a numeric representation of each call flow in the form of the vector of numbers.

In implementations, the method can include establishing a dictionary of keywords for each call flow of the plurality of call flows based on common keywords of the call flow. The method can include the device identifying the count of the number of occurrences for each keyword in the dictionary of keywords for the corresponding call flow.

In implementations, the method can include the device classifying, using a k-means clustering function, each call flow of the plurality of call flows into the one or more clusters to identify call flows of the plurality of call flows with common characteristics. In implementations, the method can include the device classifying each call flow into a cluster of the one or more clusters based on a cosine similarity of each call flow to a baseline vector of each of the one or more clusters.

The method can include the device identifying a mean cosine similarity for each of the one or more clusters. The method can include the device determining a cosine similarity for a call flow of the plurality of call flows with each of the one or more clusters. The method can include the device classifying the call flow into a cluster of the one or more clusters based on the cosine similarity for the call flow with the cluster being greater than or equal to the mean cosine similarity for the cluster.

In implementations, the method can include the device identifying, based at least on the one or more clusters, which one or more modules of the plurality of modules are operating anomalously.

At least one aspect is directed to a system to identify anomalous calls flowing through modules. The system can include a device having one or more processors coupled to memory. The device can establish, using information extracted from a log file, a plurality of call flows. Each of the plurality of call flows can identify information from the log file of a call flowing through a plurality of modules. The device can identify a count of a number of occurrences of one or more keywords in information of each call flow of the plurality of call flows. The device can generate a vector of numbers for each call flow based at least on the count for the one or more keywords for that call flow. The device can classify, using the vector of numbers for each call flow, each call flow into one or more clusters that indicate whether an operation of the call flow is anomalous.

In implementations, the device can extract information from the log file for each call flow based at least on a transaction identifier and timestamps. The device can sort identifiers of modules for each call flow by the timestamps for each transaction identifier. The device can convert alpha numeric data from the extracted information for each call flow to a numeric representation of each call flow in the form of the vector of numbers. In implementations, the device can establish a dictionary of keywords for each call flow of the plurality of call flows based on common keywords of the call flow.

The device can identify the count of the number of occurrences for each keyword in the dictionary of keywords for the corresponding call flow. The device can classify, using a k-means clustering function, each call flow of the plurality of call flows into the one or more clusters to identify call flows of the plurality of call flows with common characteristics. The device can classify each call flow into a cluster of the one or more clusters based on a cosine similarity of each call flow to a baseline vector of each of the one or more clusters.

The device can identify a mean cosine similarity for each of the one or more clusters. The device can determine cosine similarity for a call flow of the plurality of call flows with each of the one or more clusters. The device can classify the call flow into a cluster of the one or more clusters based on the cosine similarity for the call flow with the cluster being greater than or equal to the mean cosine similarity for the cluster.

The device can identify, based at least on the one or more clusters, which one or more modules of the plurality of modules are operating anomalously.

At least one aspect is directed to a non-transitory computer readable medium storing instructions that, when executed by one or more processors, cause the one or more processors to identify anomalous calls flowing through modules. The instructions can include instructions to establish, using information extracted from a log file, a plurality of call flows. Each of the plurality of call flows can identify information from the log file of a call flowing through a plurality of modules. The instructions can include instructions to identify a count of a number of occurrences of one or more keywords in information of each call flow of the plurality of call flows. The instructions can include instructions to generate a vector of numbers for each call flow based at least on the count for the one or more keywords for that call flow. The instructions can include instructions to classify, using the vector of numbers for each call flow, each call flow into one or more clusters that indicate whether an operation of the call flow is anomalous.

In implementations, the instructions can include instructions to extract information from the log file for each call flow based at least on a transaction identifier and timestamps.

The details of various embodiments of the disclosure are set forth in the accompanying drawings and the description below.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

Figure 1A:
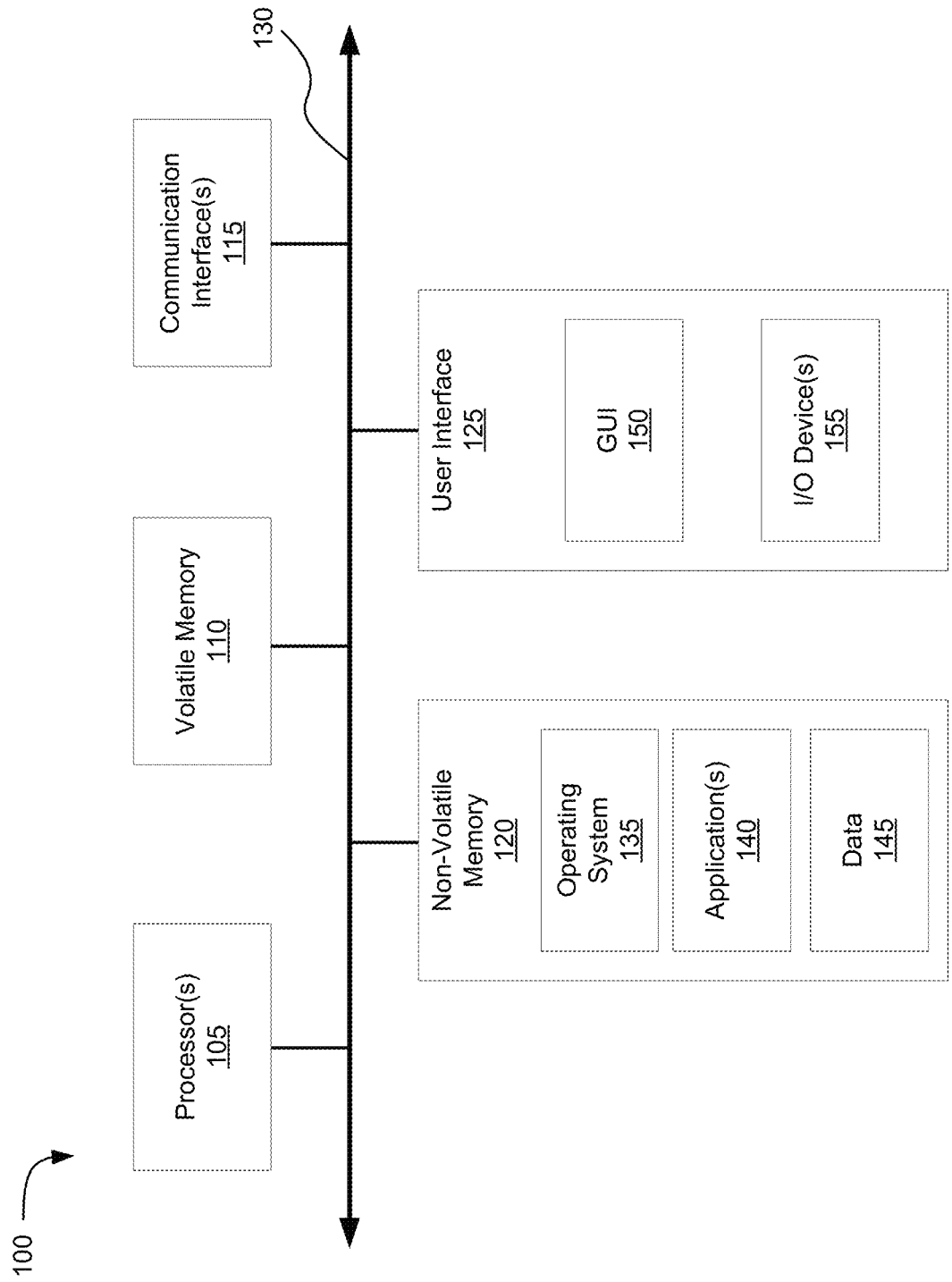
FIG. 1A is a block diagram of embodiments of a computing device.

Systems and methods of this technical solution are directed to reconstructing execution call flows to detect anomalies are provided. The technical solution can reconstruct the call flow from the logs using one or more of a transaction identifier, time stamp, and module or pod information. The technical solution can transform keywords such as error, response, status, pod name, or method into a numerical vector based on a count of the number of occurrences of each keyword. The technical solution can classify this numerical vector to identify an outlier call flow.

For example, application code, third-party libraries, databases, or other modules hosted or provided by one or more devices, servers or cloud computing environments can generate logs. The logs can indicate status information or errors associated with the modules. Cloud services can use the logs to troubleshoot or identify potential issues or vulnerabilities. However, there can be various challenges associated with analyzing the logs, including, for example: incomplete or fragmented details; manual correlation and analysis; tedious and time consuming to identify the real issue; external dependencies on developers to follow the log format, common identifier and to upload to the centralized server; text centric; or high volume of logs. When there is an outage of a cloud service due to an issue with a module, the challenges associated with identifying the issue can increase the duration of the outage, thereby causing excessive downtime in a cloud service.

Systems and methods of this technical solution can receive logs from the modules and reconstruct the call flow to identify anomalous calls. For example, a system of this technical solution can receive the logs and then organize them based on a common identifier (e.g., a transaction identifier), module name (e.g., stylebook), and sort the logs based on a timestamp. The system can simulate the call flow using the organized logs. The system can detect anomalous call flows from the reconstructed or simulated call flows. For example, the system can generate a dictionary from common keywords for a call flow, such as errors, response, status, method, pod_name, etc. The system can use the dictionary to convert the log files into a vectorized format that includes a count of a number of occurrences of the keywords in the dictionary. The system can separate the vectors into clusters, such as a first cluster with normally executed call flows, and a second cluster with anomalously executed call flows. The system can further analyze the call flows in the anomalous clusters by comparing the anomalous call flow with a set of known call flows in order to identify the anomalous call flow with a higher degree of confidence.

For purposes of reading the description of the various embodiments below, the following descriptions of the sections of the specification and their respective contents can be helpful:

Section A describes a computing environment which can be useful for practicing embodiments described herein.

Section B describes systems and methods for reconstructing call flows to detect anomalous call flows.

A. Computing Environment

Prior to discussing the specifics of embodiments of the systems and methods of reconstructing call flows to detect anomalous call flows, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
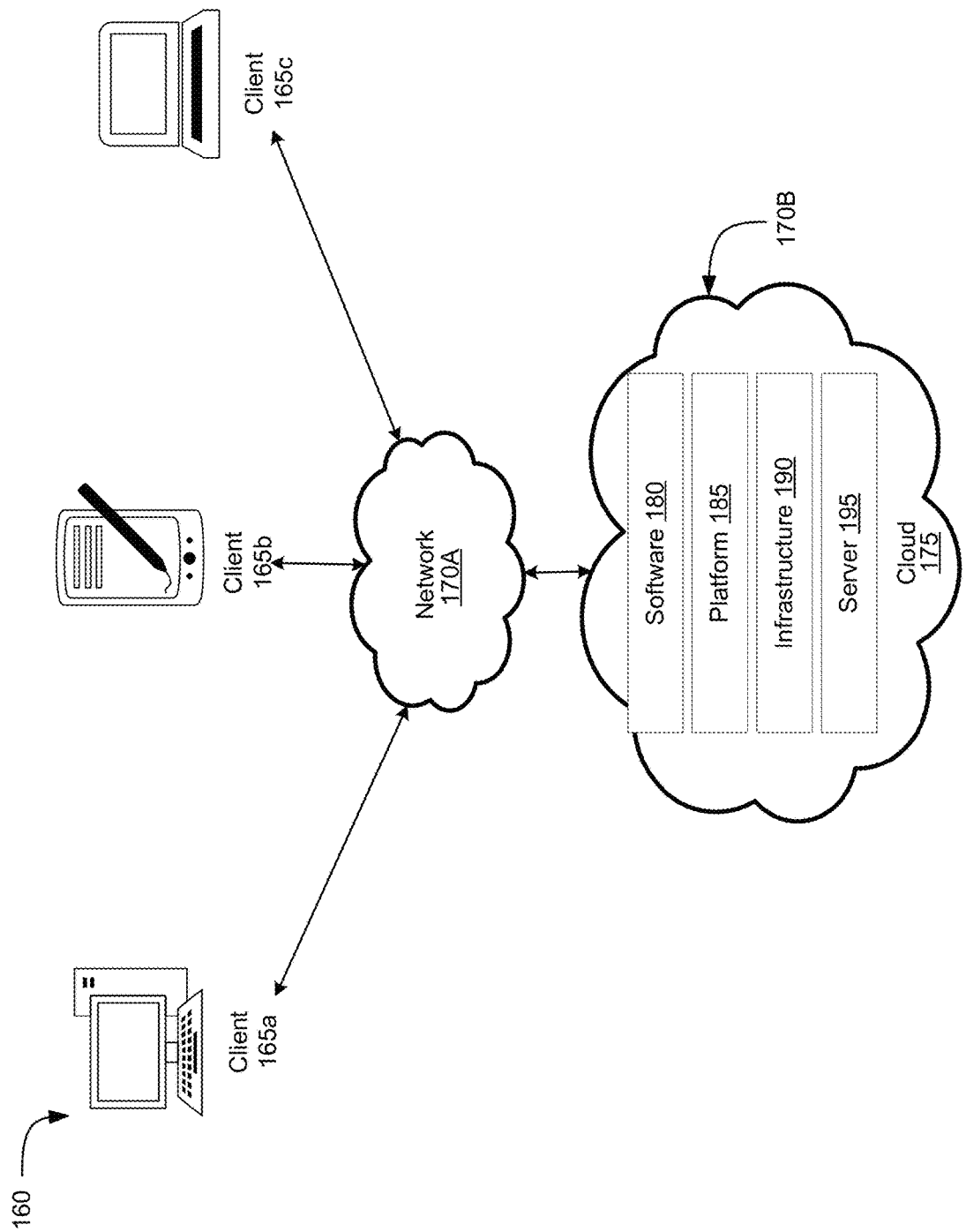
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Systems and Methods for Reconstructing Call Flows to Detect Anomalous Call Flows Systems and methods of this technical solution are directed to reconstructing execution call flows to detect anomalies are provided. The technical solution can reconstruct the call flow from the logs using one or more of a transaction identifier, time stamp, and module or pod information. The technical solution can transform keywords such as error, response, status, pod name, or method into a numerical vector based on a count of the number of occurrences of each keyword. The technical solution can classify this numerical vector to identify an outlier call flow.

For example, it can be challenging to debug technical issues that arise in various applications or modules. Technical issues can include, for example, an application launching slowly, becoming unresponsive, crashing, or otherwise not performing as intended or desired. The application or associated code can generate and provide a log associated with the technical issue. The application or associated code can provide the log to a cloud service or other data processing system for analysis. However, the logs can be challenging to analyze due to different the different modules associated with the overall application performance and delivery. For example, an engineer may attempt to stitch together different logs to address the technical issue. Further, the logs can be very large, such as a gigabyte in file size, making it challenging to analyze the logs in an efficient manner to address the issue without an excessive outage of the application.

Systems and methods of this technical solution can receive logs from the modules and reconstruct the call flow to identify anomalous calls. For example, a system of this technical solution can receive the logs and then organize them based on a common identifier (e.g., a transaction identifier), module name (e.g., stylebook), and sort the logs based on a timestamp. The system can be configured to embed a unique identifier into each log that is generated by a module, such as the traction identifier. Logs associated with a single request, or call, can include the same transaction identifier. For example, a request from a client to download an application can traverse multiple modules, including an application delivery controller. Each module can generate a log and include the same transaction identifier for further analysis. Each subsequent hop can use the same identifier, which can be carried forward. However, the timestamp can change from hop to hop. Each module that is part of the service can receive a request and generate a log with information associated with the received request. For example, a front end can generate a unique identifier, log the service name, input a time stamp of when the request was received, and include an indication as to what function the module performs. Each module can generate its own log in real-time, and push the log to the data processing system, or other cloud service, for storage and further processing.

The system can combine the logs for a time interval and sort the logs based on a time stamp and transaction identifier. The system can simulate the call flow using the sorted logs. The system can provide a visualization of the call flow that can include an indication of each of the modules associated with the call from the client, front-end, intermediaries, back-end and then back to the client, for example. The system can generate a service graph illustrating the reconstructed call flow.

The system can detect anomalous call flows from the reconstructed or simulated call flows. For example, the system can generate a dictionary from common keywords for a call flow, such as errors, response, status, method, pod_name, etc. The system can use the dictionary to convert the log files into a vectorized format that includes a count of a number of occurrences of the keywords in the dictionary. The vectorized format can provide a numerical representation of a string of logs for a particular request. The system can generate the numerical representation using a bag of words technique to identify common keywords in the logs. The system can identify important or relevant keywords such as error, response time, number of hits, etc.

Similar call flows can have similar vector representations. The system can separate the vectors into clusters, such as a first cluster with normally executed call flows, and a second cluster with anomalously executed call flows. The system can further analyze the call flows in the anomalous clusters by comparing the anomalous call flow with a set of known call flows in order to identify the anomalous call flow with a higher degree of confidence. The system can compare the call flow vector to a baseline vector to classify the call flow vector. The system can compare the vectors in a cluster using a cosine similarity technique to determine with a higher likelihood of confidence whether the vector was classified correctly as being anomalous.

Upon confirming that a call flow vector has been accurately classified, the system can identify the types of requests that are resulting in the error or anomalous performance. For example, out of 100,000 requests, the system can determine that 10,000 requests are errors and then attempt to address the requests associated with the particular errors. The system can cluster the call flows with the errors and identify a common issue that is causing the error, and address the issue.

In some cases, the system can automatically resolve the technical issue. For example, if the technical issue relates to a timeout, then the system can automatically adjust the timeout value, such as a TCP window size which indicates how long an application delivery controller waits for an acknowledgment. If the TCP window size is too low, then there can be a timeout error, so increasing the timeout size can avoid or reduce some of the errors.

Figure 2:
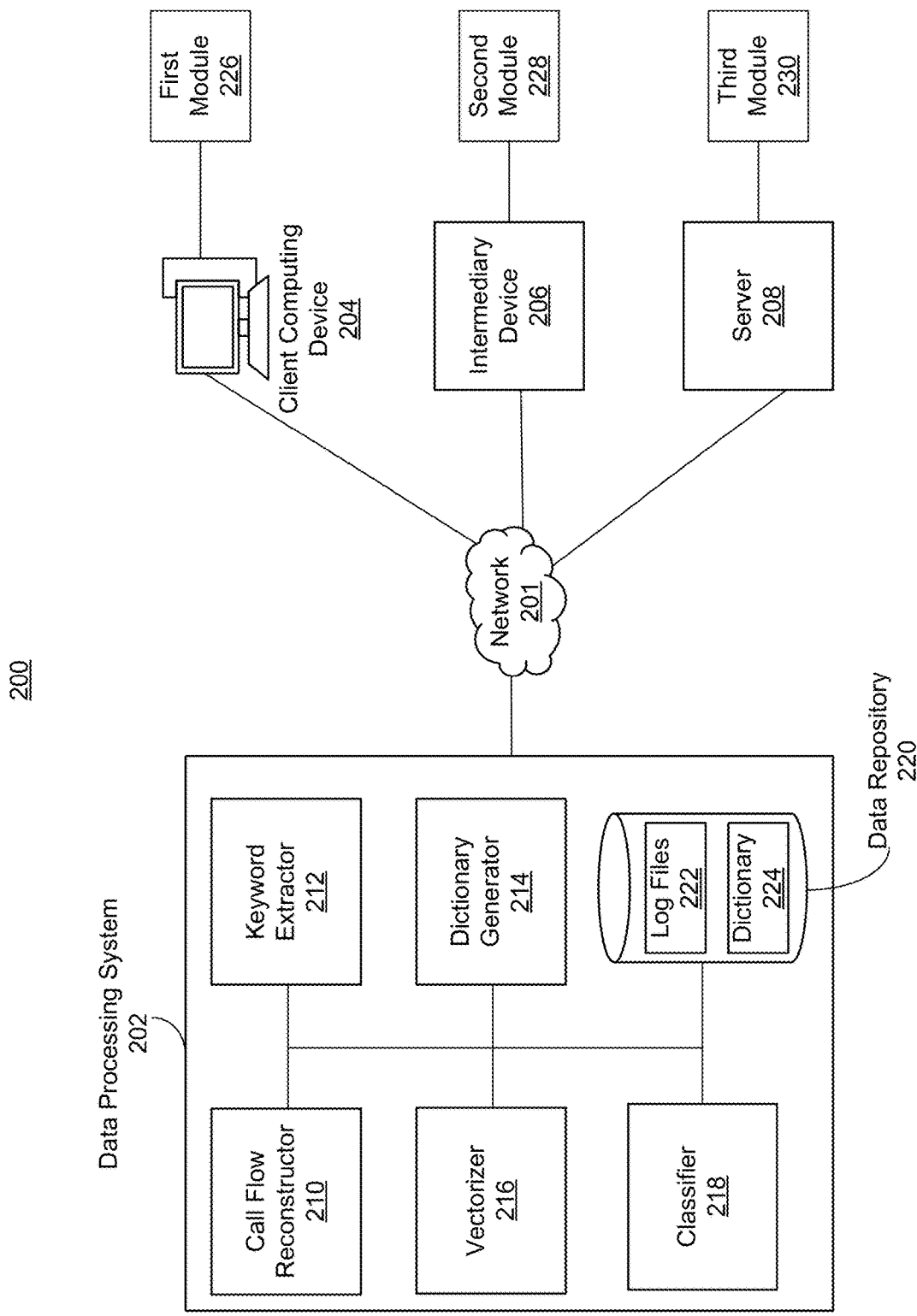
FIG. 2 is a block diagram of a system to identify anomalous calls flowing through modules, in accordance with implementations.

Referring to FIG. 2, depicted is a block diagram of a system to identify anomalous calls flowing through modules, in accordance with implementations. The system 200 can include a data processing system 202. The system 200 can include, interface with, or otherwise communication with one or more of a client computing device 204, intermediary device 206, or server 208. The data processing system 202 can be separate from the client computing device 204, intermediary device 206 or server 208. In some cases, the data processing system 202 can be part of or hosted in a same data center or cloud computing environment (e.g., cloud 175) as the server 208 or intermediary device 206.

The intermediary device 206 that can interface or communicate with a client computing device 204 via a network 201 (e.g., network 170 or network 170A, or network 170B). The intermediary device 206 can be intermediary to one or more client computing devices 204 and one or more servers 208 to handle or manage sessions between the client computing devices 204 and the one or more servers 208. The intermediary device 206 can include one or more servers, such as servers 195, or be part of the cloud 175. The intermediary device 206 can include or be part of a data center. The intermediary device 206 can include or be referred to as one or more processors, or one or more servers, or a cloud computing environment. The client computing device 204 can include one or more component or functionality of client device 165a-c depicted in FIG. 1B. The intermediary device 206 can interface with or communicate with a server 208. The server 208 can refer to or include server 195, or be part of cloud 175. The server 208 can provide resources or services, such as a software-as-a-service application. The server 208 can host applications, documents, or other resources accessed or utilized by the client computing device 204 via The intermediary device 206.

The intermediary device 206 can be intermediary or between the client computing device 204 and the server 208 in the network topology, which can include network 201 or multiple branches of network 201. The intermediary device 206 can be used to authenticate or provide single sign on services to the client device 204. The intermediary device 206 can refer to or include an application delivery controller ("ADC"). An ADC can perform various tasks to facilitate or manage network traffic or sessions, such as web acceleration, load balancing, or network security, for example. The intermediary device 206 can communicate with the client device 204 to provide access to a resource or service hosted by the server 208. The intermediary device 206 can communicate with the client device 204 to provide virtual applications or a virtual desktop or other resources hosted by the server 208. The intermediary device 206 can include memory or a storage device. The memory can be a non-transitory or non-volatile memory. Non-transitory memory can refer to computer-readable media or machine readable storage medium that can store data for short period or in the presence of power, such as a memory device or random access memory ("RAM"). The memory can be used by intermediary device 206 to handle sessions between client devices and servers.

The data processing system 202 can receive logs associated with modules or components that facilitate executing a call between the client computing device 204 and the server 208. The call can refer to a request to download an application, for example, from the server 208. The client computing device 204 can generate or initiate a call with a request to download the application. The client computing device 204 can transmit the request, which can be intercepted or received by the intermediary device 206. The intermediary device 206 can process the request, and then forward the request to the server 208. The server 208 can process the request and respond to the request. The response can be transmitted to the intermediary device 206, which can forward the response to the client computing device 204. Each of the client computing device 204, intermediary device 206 and server 208 can include one or more modules. For example, the client computing device 204 can include a first module 226, such as a front end that provides the user with the ability to make a request to download the application. The intermediary device 206 can include a second module 228 to process the request, establish a session with the server, authenticate the session, establish network security, or forward the request to the server 208. The server 208 can include a third module 230 to generate a response to the request.

Each of the modules 226, 228 and 230 associated with the call can generate a log. The modules can generate the log with a unique identifier associated with the call, time stamp associated with receipt of the call or request or other transmission, and status information associated with processing the call. The modules can provide the logs to the data processing system 202.

The system 200 can include, interface with, or otherwise access a data processing system 202. The data processing system 202 can be separate from the intermediary device 206. In implementations, the data processing system 202 can be part of or include the intermediary device 206. In implementations, the data processing system 202 can be hosted on in a same data center or cloud 175 as the intermediary device 206. The data processing system 202 can include one or more servers, such as servers 195, or be part of the cloud 175. The data processing system 202 can include or be part of a data center. The data processing system 202 can include or be referred to as one or more processors, or one or more servers, or a cloud computing environment. The data processing system 202 can include a call flow reconstructor 210 designed, constructed and operational to receive the logs from the modules and reconstruct or establish the call flow. The data processing system 202 can include a keyword extractor 212 designed, constructed and operational to pre-process the logs and extract keywords. The data processing system 202 can include a dictionary generator 214 designed, constructed and operational to identify common keywords or other important keywords from the logs and generate a dictionary, such as using a bag of words technique, with the relevant keywords for the logs. The data processing system 202 can include a vectorizer 216 designed, constructed and operational to convert the call flow into a numerical vector representation using the dictionary. The data processing system 202 can include a classifier 218 designed, constructed and operational to classify the vector as anomalous or nominal. The data processing system 202 can include a data repository 220 storing log files 222 received from the modules associated with the call flow, and the dictionary 224 generated by the dictionary generator 214. The components of the data processing system 202 can be a single component or multiple components.

The system 200 and its components can include hardware elements, such as one or more processors, logic devices, or circuits. The data processing system 202, intermediary device 206, client computing device 204, or server 208 can include or be implemented using hardware or a combination of software and hardware. For example, components of the data processing system 202, intermediary device 206, client computing device 204, or server 208 can include logical circuitry (e.g., a central processing unit or CPU) that responds to and processes instructions fetched from a memory unit. Components of the data processing system 202, intermediary device 206, client computing device 204, or server 208 can include or use a microprocessor or a multi-core processor. A multi-core processor can include two or more processing units on a single computing component. Components of the data processing system 202, intermediary device 206, client computing device 204, or server 208 can be based on any of these processors, or any other processor capable of operating as described herein. Processors can utilize instruction level parallelism, thread level parallelism, different levels of cache, etc. For example, the data processing system 202, the intermediary device 206, client computing device 204, or server 208 can include at least one logic device such as a computing device or server having at least one processor 105. The components and elements of the data processing system 202, the intermediary device 206, client computing device 204, or server 208 can be separate components or a single component. For example, the data processing system 202 and the intermediary device 206 can be a single component. The data processing system 202, intermediary device 206, client computing device 204, or server 208 can include a memory component, a random access memory (RAM) or other dynamic storage device, a storage device for storing information, and instructions to be executed. The memory can include at least one read only memory (ROM) or other static storage device coupled with the storage device for storing static information and instructions. The memory can include a storage device, such as a solid state device, magnetic disk or optical disk, to persistently store information and instructions.

Still referring to FIG. 2, and in further detail, the system 200 can include, access, communicate with, or otherwise interface with a client computing device 204 that executes or provides a first module 226. The client computing device 204, via the first module 226, can initiate a call flow with the server 208 via the intermediary device 206. The call flow can refer to a session to access a resource or service provided by the server 208, such as a web or SaaS delivered application from the server 208, or download an application from the server 208. The call can be executed by one or more of the second module 228 of the intermediary device 206 or the third module 230 of the server 208. The call flow can execute or perform as desired, or may be rejected, be delayed, or otherwise not perform as desired. Each of the modules 226-230 can generate a log associated with a unique identifier of the call. The log can include the unique identifier, a time stamp associated with when the corresponding module received the call, and information about how the module processed the call or performed.

The data processing system 202 can receive call logs from the modules that participated in the call flow, including, for example, the first module 226, second module 228 and the third module 230. The data processing system 202 can store the logs in the log files data structure 222. The data processing system can 202 can retrieve the logs from the log files 222. The data processing system 202 can perform a lookup to retrieve log files 222 associated with a particular transaction or other unique identifier that indicates that the logs are for a particular call flow.

The data processing system 202 can include a call flow reconstructor 210 designed, constructed and operational to establish a call flow from the log files 222. The call flow reconstructor 210 can establish, using information extracted from a log file, one or more call flows. Each of the call flows can identify information from one or more log files 222 stored in data repository 220. The log file can be for a call flowing through one or more modules 226, 228 and 230. To establish the call flow, the call flow reconstructor 210 can extracting information from the log file for each call flow based at least on a transaction identifier and timestamps. The call flow reconstructor 210 can sorting identifiers of modules (e.g., modules 226-230) for each call flow by the timestamps for each transaction identifier.

The following are three example log files generated as part of a call flow that can be stored in log files 222 in data repository 220.

Example First Log File: {"log":"2020-11-20 16:19:26 [129:example1_web_logger:100] [INFO] 838536639fcd66c1e621a17a000ad197: Received response '200' for url 'http://mgmt-monit/example1' and method 'GET' in '79.47' ms.\n", "stream": "stdout", "docker": {"container_id": "4093fcc99f7c4438055c9fb88a97791704545 2b14c2f2ba3633c6eaf2c9a3eba"}, "kubernetes": {"container_name": "fe","namespace_name":"default", "pod_name": "frontend-7f6d8f8967-8j6ts","pod_id":"5cd63750-b779-4eb8-9461-c47d691ed440","labels": {"app":"frontend", "pod-template-hash":"7f6d8f8967","tier":"frontend"}, "host":"ip-172-21-9-184.us-east-2.compute.internal", "master_url":"https://10.100.0.1:443/api","namespace_id": "ef67877f-82f5-11ea-a1d6-0ac96e16fd8c"}}

Example Second Log File: {log":"2020-11-20 16:19:26 [129:example1_web_logger:80] [INFO] 838536639fcd66c1e621a17a000ad197: Sending request for url 'GET' and method 'http://mgmt-monit/example1"\n", "stream":"stdout","docker":{"container_id": "4093fcc99f7c4438055c9fb88a 977917045452b14c2f2ba3633c6eaf2c9a3eba"},"kubernetes": {"container_name":"fe","namespace_name":"default","pod_name":"frontend-7f6d8f8967-8j6ts","pod_id": "5cd63750-b779-4eb8-9461-c47d691ed440","labels": {"app":"frontend","pod-template-hash":"7f6d8f8967", "tier":"frontend"},"host":"ip-172-21-9-184.us-east-2.compute.internal","master_url":"https://10.100.0.1:443/api","namespace_id":"ef67877f-82f5-11ea-a1d6-0ac96e16fd8c"}}

Example Third Log File: {"log":"Friday, 23 Oct. 20 05:35:47.704+0000 [Debug] [TCPServerConnection (default[#189])] process_name=example1_service hostname=mgmt-monit-5d748b8586-skjkr [::ffff: 172.24.10.43]:36448 \"GET/nitro/v1/config/ si_log_expression?args=si_device_ip_address: 172.16.10.15-172.16.10.16,si_app_unit_name:Podio, transactionid: 0&duration=last_1_month&asc=no&order_by=transactionid HTTP/1.1\" 200 263\"-\"\"Mozilla/5.0 (Macintosh; Intel Mac OS X 10_15_7) AppleWebKit/537.36 (KHTML, like Gecko) Chrome/86.0.4240.80 Safari/537.36\" Accept-Encoding:gzip, true\n","stream": "stdout","docker":{"container_id":"7cb89a143c674453b3d2de14bd1473P9da0a 759ae7fce90cecf03fac1065a419"},"kubernetes": {"container_name":"mm","namespace_name":"default", "pod_name":"mgmt-monit-5d748b8586-skjkr","pod_id": "2945db63-139e-11eb-80b0-061e51542970","labels": {"app": "mgmt-monit","pod-template-hash": "5d748b8586","tier": "backend"},"host":"ip-172-24-9-125.us-east-2.compute.internal","master_url":"https:// 10.100.0.1:443/api","namespace_id":"f58be52e-7aed-11ea-89a8-0a7954fca7d4"}}

As illustrated, the First Log File includes the a unique identifier or transaction identifier "838536639fcd66c1e621a17a000ad197". The Second Log File includes the same transaction identifier "838536639fcd66c1e621a17a000ad197". The log files include a time stamp indicating when the request was received. The log files include an indication of the module or pod (e.g., first module 226) that generated the log. For example, the First Log File indicates the module name or pod name is: "frontend-7f6d8f8967-8j6ts", and the pod identifier can be "pod_id":"5cd63750-b779-4eb8-9461-c47d691ed440". The first log file can further include a date and time stamp of when the call was received or the log was generated, as follows: "log":"2020-11-20 16:19:26.

The second log file can include the same unique identifier as the first log file as the second log file can correspond to the same call flow. For example, the second log file also indicates the following transaction identifier: 838536639fcd66c1e621a17a000ad197. The second log file can include a date and time stamp of 2020-11-20 16:19:26, which can be close in time to the time stamp of the first log file as they are associated with the same call flow. The third log file includes a different date and time stamp as it may be associated with a different call flow, for example.

To reconstruct or establish the call flow, the call flow reconstructor 210 can obtain all the log files from the separate modules (e.g., modules 226-230). The call flow reconstructor 210 can sort the log files using time stamp (e.g., time stamp of the log files, time stamp of creation of the log file, time stamp of receipt of the call, etc.). The call flow reconstructor 210 can use a function, logic, or other tool to parse the log files. The call flow reconstructor 210 can sort the log files by the time stamp and transaction identifier. By sorting the log files by transaction identifier and then by time stamp, the call flow reconstructor 210 can reconstruct the call flow across different modules (e.g., modules 226-230).

Figure 3:
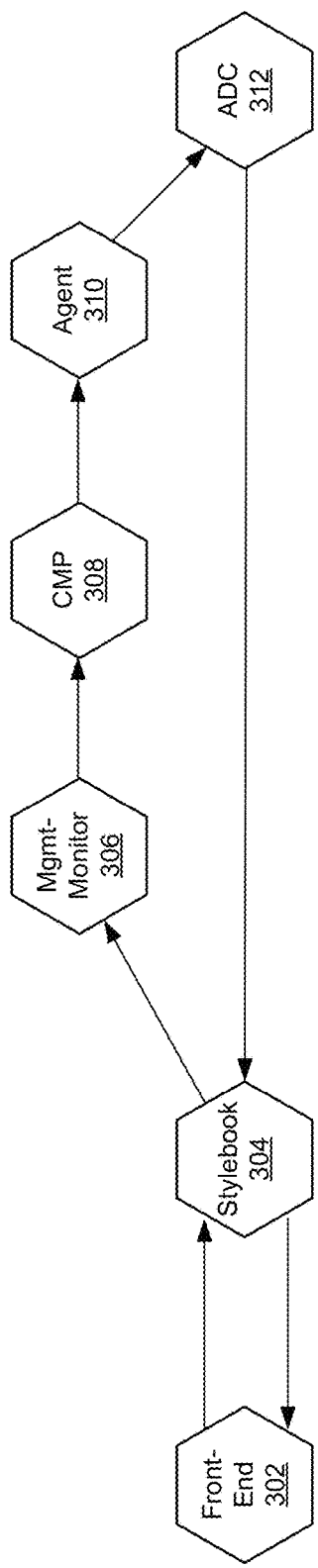
FIG. 3 is diagram depicting an example call flowing through modules, in accordance with implementations.

For example, the input to the call flow reconstructor 210 can be one or more log file names, and the output of the call flow reconstructor 210 can be module names sorted by the timestamp for each unique transaction. With the output from the call flow reconstructor 210, the call flow can be reconstructed. FIG. 3 is diagram depicting an example call flowing through modules as reconstructed by the call flow reconstructor 210. The call flow 300 depicted in FIG. 3 can be established from the log files 222 stored in the data repository 220. The call flow 300 can be reconstructed or established by the data processing system 202.

The call flow 300 can illustrate the different modules (e.g., modules 226-230) that generate log files. The call flow 300 can depict an illustrative call flow for an application delivery management service. The application delivery management service can provide centralized network management, analytics, or automation as a service from a cloud computing environment to support virtualized or containerized application deployed across public clouds or on-premise data centers. For example, the call can begin through a front-end module 302. The frontend module 302 can initiate the call or generate a request for a resource or service, such as to download an application. The call can flow from the front-end module 302 to a stylebook module 304. The stylebook module 304 can refer to a template that can be used to create and manage an application delivery controller ("ADC"). The stylebook module 304 can include one or more configurations that are established for an enterprise application deployment, such as an electronic messaging or mail system such as Microsoft Exchange. The call can flow from the stylebook 304 to a management monitor module 306. The management monitor module 306 can allow an administrator to monitor, troubleshoot, analyze or remediate issues associated with the call flow. The call can flow from the management monitor 306 to a compression ("CMP") module 308. The CMP module 308 can include compression parameters and perform compression tasks. The CMP module 308 can provide a compression counter or other statistics associated with the call flow. The call can flow from the CMP module 308 to an agent 310. The agent 310 can perform various tasks associated with the call flow or request. The call can flow from the agent 310 to the application delivery controller ("ADC") 312. The ADC 312 can receive the request initiated by the front-end 302 and respond to the request. The ADC 312 can generate a response and provide the response back to the stylebook 304. The stylebook 304 can receive the response from the ADC 312 and forward the response back to the front-end 302. Thus, the call can flow from the front-end 302 to the ADC 312 and back through multiple modules, and the call flow reconstructor 210 can reconstruct or establish the call flow 300 using information extracted from one or more log files 222.

The data processing system 202 can include a keyword extractor 212 designed, constructed and operational to extract keywords from the log files. The keyword extractor 212 can parse the log files 222 associated with the reconstructed call flow to identify relevant or important keywords, such as error, status, method such as HTTP GET or HTTP POST that characterize anomalous call flows. For example, the call flow reconstructor 210 can reconstruct the call flow using the transaction identifier and time stamps, and the keyword extractor can extract keywords from the call flows.

The keyword extractor 212 can use a bag of words model or technique to extract the keywords from the log files. The data processing system 202 can include a dictionary generator 214 designed, constructed and operational to generate a dictionary from the extracted keywords. The dictionary can include keywords that are indicative of an anomalous call flow. The dictionary generator 214 can store the dictionary 224 in data repository 220. For example, the dictionary for the call flow 300 can include the important keywords: error, status, method such as HTTP GET or HTTP POST. In some cases, the dictionary 224 can be predetermined or previously generated and stored in the dictionary 224. In some cases, the data processing system 202 can generate the dictionary 224 for the particular call flow analysis. The data processing system 202 can establish the dictionary 224 of keywords for each call flow of the plurality of call flows based on common keywords of the call flow, and identify the count of the number of occurrences for each keyword in the dictionary 224 of keywords for the corresponding call flow.

The data processing system 202 can include a vectorizer 216 designed, constructed and operational to generate a numerical vector representation of the call flow, such as call flow 300. The numerical vector representation can include a calculation or count of the occurrences of the keywords in the dictionary 224 for each call flow, such as call flow 300. For example, keywords (e.g., error, status, HTTP GET) and a transaction identifier, the vectorizer 216 can generate a vector with the length of the dictionary 224 (e.g., the number of keywords in the dictionary 224). Each scalar in the vector can denote the number of occurrences, for each word in the dictionary, for a specific call flow. For example, if the dictionary contains three words and the log file contains only the first two of them, with the first one occurring once and the second twice, the resulting vector can be: [1, 2, 0]. Thus, the data processing system 202 can transform the log files 222 to a call flow 300 and to a numerical vector representation that can be used to determine whether the call flow is anomalous.

Figure 4:
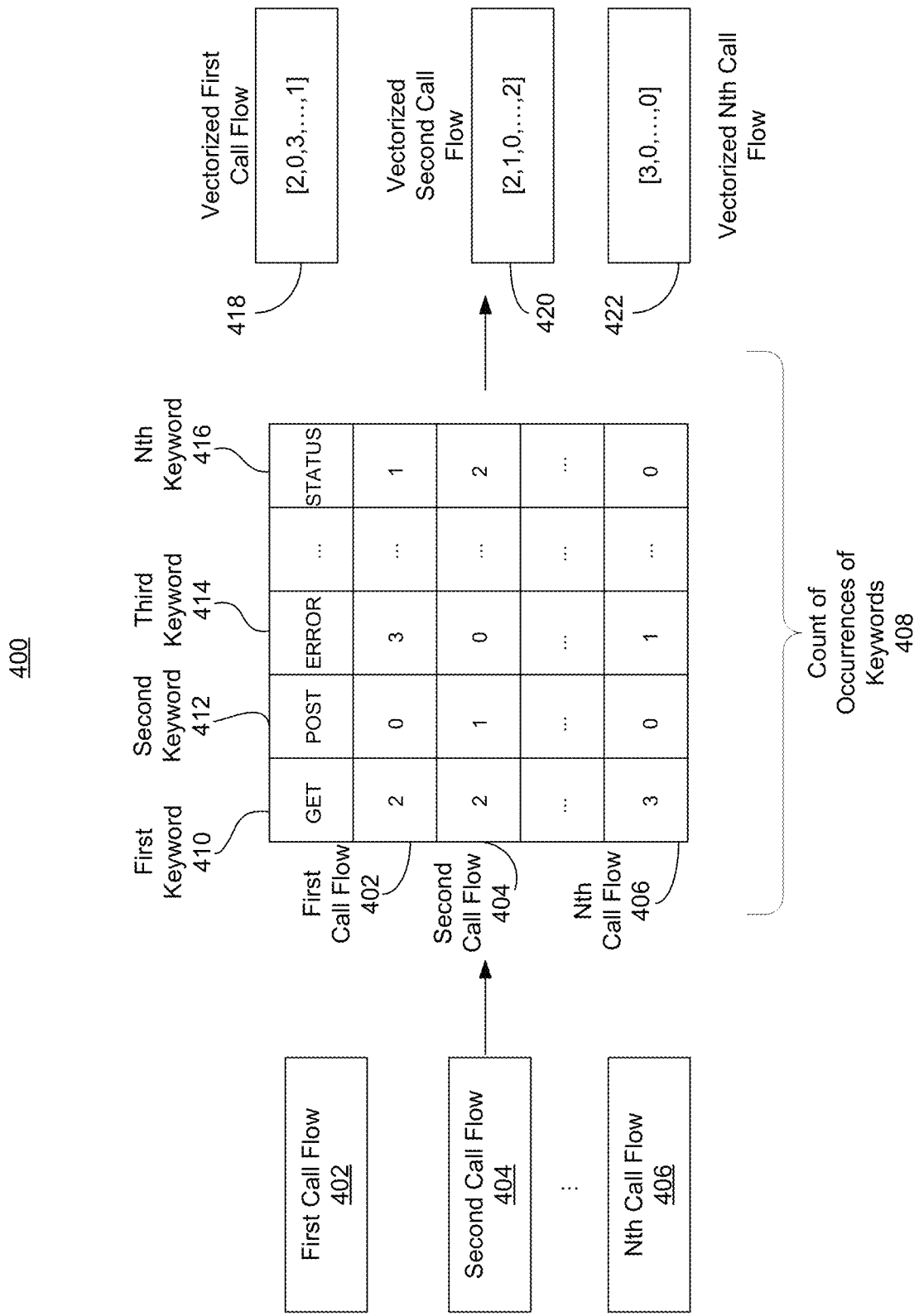
FIG. 4 is a diagram illustrating vectorising call flows to detecting anomalous calls flowing through modules, in accordance with implementations.

To do so, the vectorizer 216 can parse the log files of the call flow to identify the keywords in the dictionary. The vectorizer 216 can count the number of occurrences of each of the keywords of the dictionary 224 in the log files of the call flow. FIG. 4 is a diagram illustrating vectorizing call flows to detect anomalous calls flowing through modules, in accordance with implementations. The operational flow 400 can be performed by one or more component or system depicted in FIG. 1A, 1B or 2, including, for example, the data processing system 202. As illustrated in FIG. 4, the process 400 can include reconstructing or establishing one or more call flows from log files 222, such as a first call flow 402, a second call flow 404, and so on to an Nth call flow 406. The raw log files can be input for each of the call flows 402-406, from which the vectorizer 216 can identify or generate a dictionary 224 for the call flows 402-406 to generate a numerical vector representation for each call flow. For example, the keywords can include a first keyword 410 "GET", a second keyword 412 "POST", a third keyword 414 "ERROR", and an Nth keyword 416 "Status". The vectorizer 216 can generate a vector or an array with a count of occurrences of keywords. The vectorizer 216 can generate a vector for each of the call flows 402-406, where the vector for the call flow can correspond to a row in the array 408. To generate the vector for each call flow, the vectorizer 216 can count the number of occurrences of the keywords 410-416 in the logs associated with the reconstructed call flow that were generated from the modules of the call flow. For example, the first call flow 402 can include two occurrences of the first keyword 410 "GET", zero occurrences of the second keyword 412 "POST", three occurrences of the third keyword 414 "ERROR", and one occurrence of the Nth keyword 416 "STATUS". Thus, the vectorizer 216 can generate the vectorized first call flow 418 as [2,0,3, . . . 1]. Similarly, the vectorizer 216 can generate a vectorized second call flow 420 as [2,2,0, . . . 2], and a vectorized Nth call flow 422 as [3,0, . . . , 0]. Thus, the data processing system can identify a count of a number of occurrences of one or more keywords in information of each call flow of the multiple call flows 402-406, and generate a vector of numbers (e.g., 418-422) for each call flow 402-406 based at least on the count (e.g., 408) for the one or more keywords (e.g., 410-416) for that call flow.

By identifying the keywords using the information extracted from the logs used to reconstruct the call flows, the data processing system 202 can convert alpha numeric data from the extracted information for each call flow 402-406 to a numeric representation of each call flow in the form of the vector of numbers 418-422. For example, the example log files can include alpha numeric number in the form of transaction identifiers, time stamps, or other keywords, which can be used to generate the vector of numbers.

The data processing system 202 can include a classifier 218 designed, constructed and operational to classify, using the vector of numbers for each call flow, each call flow into one or more clusters that indicate whether an operation of the call flow is anomalous. The classifier 218 can identifying call flows that resulted in errors. The classifier 218 can detect the anomalous cases of call flows in an unsupervised manner. For example, due to the limited amount of training examples, and the time consuming task of gathering training examples, the classifier 218 can be configured with an unsupervised learning manner. For example, the classifier 218 can detect anomalous cases through the use of a K-Means clustering function. Since the dictionary 224 can be generated using a bag-of-words function in a way that highlights differences between normal and erroneous call flows (e.g., through the use of keywords like "error", "200 OK", etc.), the classifier 218 using the K-Means function can distinguish between the normal and erroneous call flows.

The classifier 218 can be configured with the K-Means function. In the K-means function of the classifier 218, the centroids of the function can be initialized with random numbers. The number of clusters in the function can be set to 2 (e.g., one for the anomalous or erroneous cases and one for the normal cases). The number of times the k-means function can be run with different centroid seeds can be set to 10. The maximum number of iterations of the K-Means algorithm for a single run can be set to 300. The relative tolerance with regards to a vector norm (e.g., a Frobenius norm) of the difference in cluster centers of two consecutive iterations to declare convergence can be set to $1 \times 10^{-3}$. The Frobenius norm can refer to a vector norm in a vector space whose elements (vectors) can be matrices.

The classifier 218, with the K-means function, can generate two clusters, one with the log files that correspond to normal executions and another one with log files where an error occurred. Whether the cluster is normal or anomalous can be determined by counting the number of the vectors that contain the keyword "error" (or similar) in each one of them. Thus, the classifier 218, using K-means, can generate two clusters from the call flows, one that is normal behavior, and one that is erroneous behavior.

Figure 5:
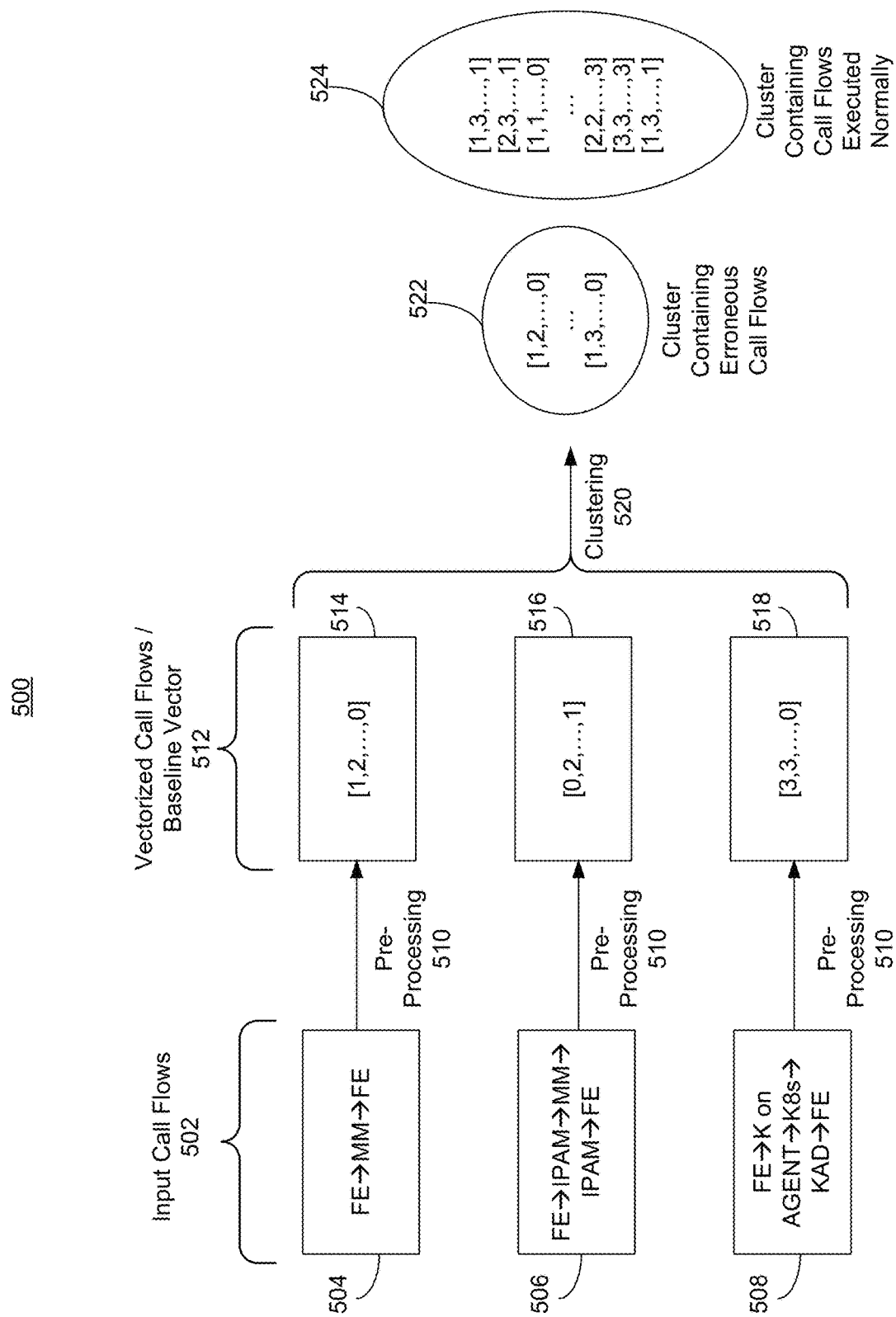
FIG. 5 is a diagram illustrating clustering vectorized call flows to detect anomalous calls flowing through modules, in accordance with implementations.

FIG. 5 is a diagram illustrating clustering vectorized call flows to detect anomalous calls flowing through modules, in accordance with implementations. The operational flow 500 can be performed by one or more component or system depicted in FIG. 1A, 1B or 2, including, for example, the data processing system 202. As illustrated, the flow 500 includes receiving input call flows 502 that are passed through the K-means function. There can be three input call flows 504, 506, and 508 that each include calls flowing through various modules, such as a first call 504 flowing from a front-end ("FE") to a management monitor ("MM") and back to a front-end ("FE"); a second call 406 flowing from the FE to an IP address manager ("IPAM") to an MINI to the IPAM and to the FE; and a third call 508 flowing from the FE to an agent providing an open source container ("K on AGENT") to a platform that automated the deployment, scaling and management of cloud-native applications, such as Kubernetes ("K8s") to a peer-to-peer network with a Kademlia overlay protocol ("KAD") and to the FE. The data processing system 202 can pre-process 510 each of the call flows 504-508 to generate vectorized call flows 512, which can be referred to as baseline vectors 512. The vectors can be generated from a dictionary 224, containing keywords that can differentiate the error-containing executions of the reconstructed call flows, from the normal ones. The baseline vectors 512 can include, for example, a first vector 514 [1,2, . . . , 0] generated for the first call flow 504; a second vector 516 [0,2, . . . , 1] generated for the second call flow 506; and a third vector 518 [3,3, . . . , 0] generated for the third call flow 508.

The data processing system 202 (e.g., classifier 218) can perform clustering 520 to cluster to the baseline vectors 512 into two different clusters: a first cluster 522 containing erroneous call flows, and a second cluster 524 containing call flows that executed normally. The data processing system 202 can generate the two clusters based on the occurrences of keywords as indicated by the baseline vectors 512. Thus, the underlying structure of the vectors allows the K-Means algorithm to produce two clusters, corresponding to the two types of reconstructed call flows.

The classifier 218, upon generating the two clusters, can perform an additional check on the call flow to determine with a higher likelihood of confidence whether the call flow was associated with the correct cluster or category (e.g., error prone, frequently occurring, or important in some other manner). To do so, the classifier 218 can, for example, determine whether a new call flow was properly categorized by selecting a representative example for each category of interest and obtain a vectorized form of the representative example. The representative example can be referred to as a baseline vector of the particular cluster or category. In some cases, to perform this additional check, the data processing system 202 can determine that a minimum number of representative examples are available in each category (e.g., 10 examples).

The classifier 218 can determine a pairwise cosine similarities between the representative examples belonging to the same category. The classifier 218 can determine the mean of the cosine similarities in the previous step, for each category. For example if there are five baseline vectors, this operation can result in 5 category similarity means. Each similarity mean can be associated with the category of a baseline vector and serve as an indication of how similar the call flows belonging to this category. For example, the data processing system 202 can determine the cosine similarity between the vectorized form of the new call flow to be checked and each of the baseline vectors (e.g., baseline vectors 512). If one of these similarities exceeds the corresponding category similarity mean, the data processing system 202 can determine that the new call flow belongs to this category. Otherwise, the data processing system 202 can determine that the new call flow does not belong to the category.

The data processing system 202 can determine the cosine similarity using Function 1 as follows:

$$\text{Similarity} = \cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}} \quad \text{Function 1}$$

In Function 1, A and B can denote the log files in vectorized form after the Bag-of-words process.

Figure 6:
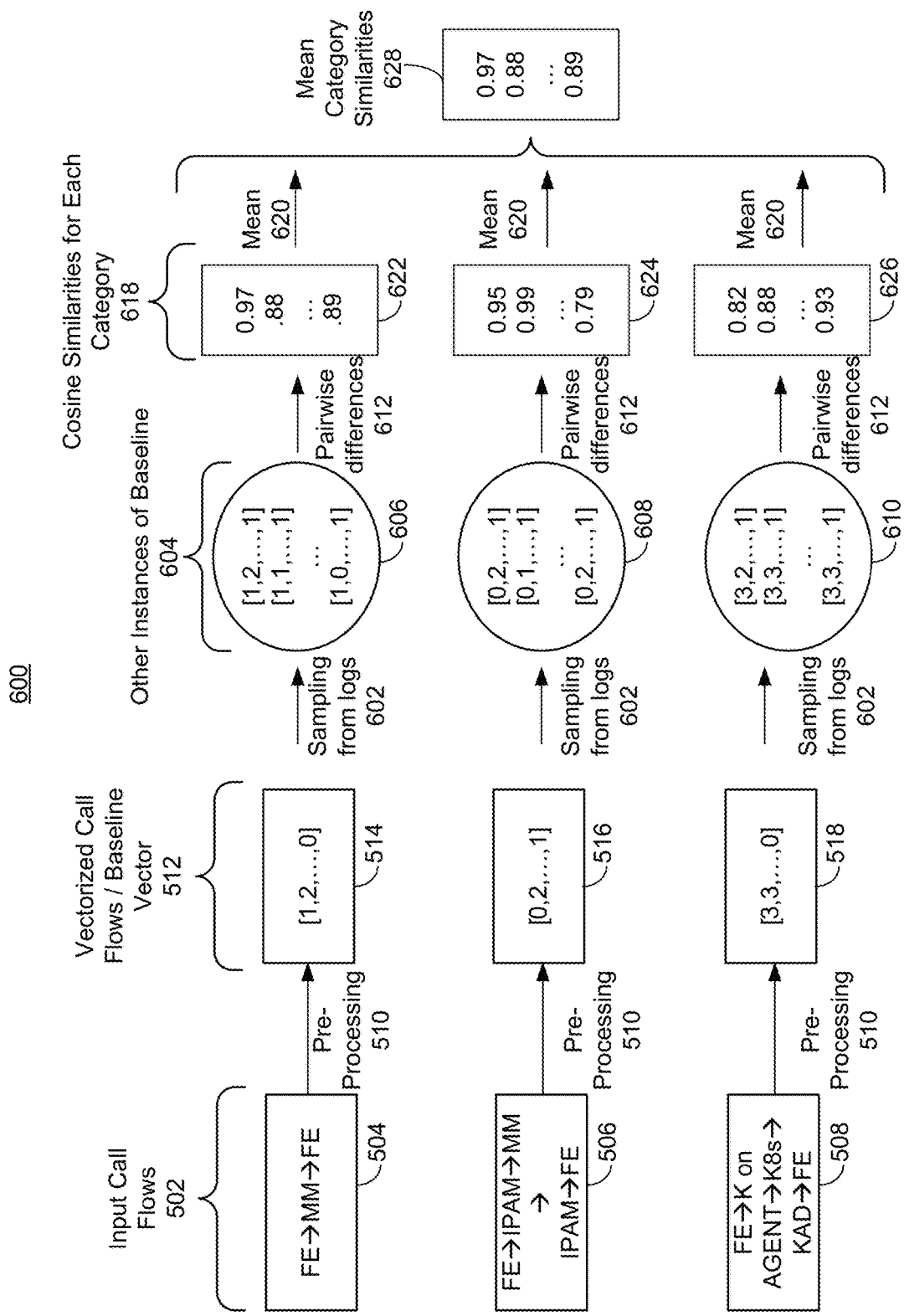
FIG. 6 is a diagram illustrating category similarities for detecting anomalous calls flowing through modules, in accordance with implementations.

FIG. 6 is a diagram illustrating category similarities for detecting anomalous calls flowing through modules, in accordance with implementations. The operational flow 600 can be performed by one or more component or system depicted in FIG. 1A, 1B or 2, including, for example, the data processing system 202. The data processing system 202 can receive the input call flows 502, pre-process 510 the call flows, and generate baseline vectors 512. The input call flows 502 can be a representative example for each of the call flow categories of interest. The data processing system 202 can performing sampling from logs 602 to sample from the log files used to generate the baseline vector 514 to identify other instances of the baseline vectors 604. For each of these call flows, other instances of them are sampled from the logs and kept into groups. For example, for the first call flow 504, there can be other instances that are clustered with the call flow 514 in the cluster 606. These other instances in cluster 606 can be similar to the call flow 504. Similarly, the second cluster 608 corresponding to the second call flow 506 can include additional instances of vectors that are determined to be similar to the call flow 506. The third cluster 610 can include additional instances that are determined to be similar to the call flow 508.

The data processing system 202 can determine pairwise differences 612 between each of the other instances 604 in each of the clusters 606-610. For each group/category, the data processing system 202 can determine the pairwise cosine similarities. For example, the data processing system 202 can determine a cosine similarity for each category 618 using Function 1. The cosine similarity can be between each call flow and the other instances of call flows in the cluster. For example, for the first cluster 606, the cosine similarities can be indicated in block 622; for the second cluster 608, the cosine similarities can be indicated in block 624; and for the third cluster 610, the cosine similarities can be indicated in block 626. The data processing system 202 can generate a mean 620 category of similarities 628 that includes the mean or average for each group/category. For example, for the first category 622, the mean category similarity can be 0.97; the mean for the second category 624 can be 0.88; and the mean for the third category 626 can be 0.89.

Figure 7:
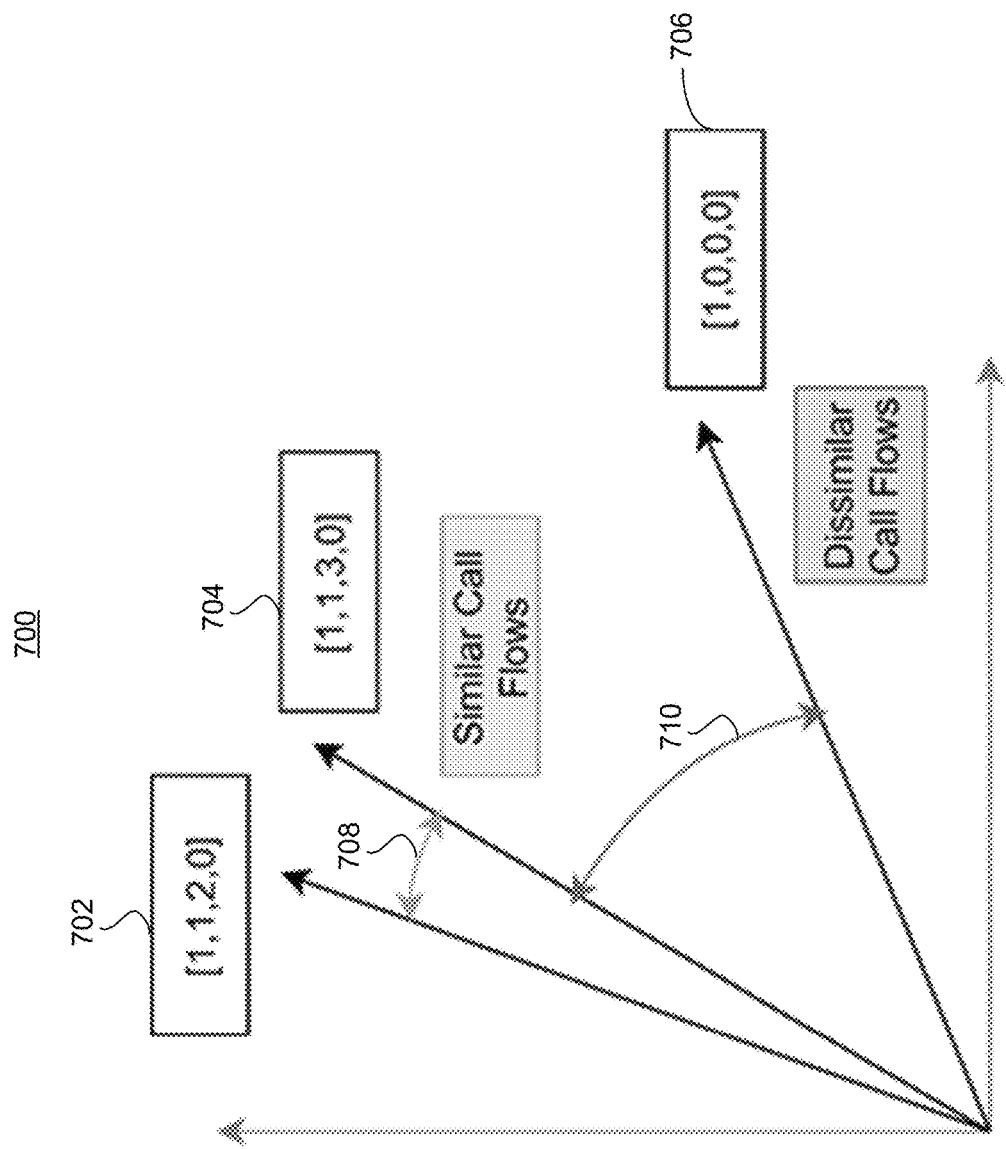
FIG. 7 is a diagram illustrating cosine similarities of call flows to detect anomalous call flows, in accordance with implementations.

FIG. 7 is a diagram illustrating cosine similarities of call flows to detect anomalous call flows, in accordance with implementations. The graph 700 can be generated by one or more component or system depicted in FIG. 1A, 1B or 2, including, for example, the data processing system 202. The graph 700 illustrates cosine similarity as a measure of the resemblance of two call flows in vectorized form. Similar call flows can have an angle that is approximately 0 degrees or close to 0 degrees, and therefore the cosine similarity can be approximately 1. For example, the data processing system 202 can determine that the vectorized call flow 702 and the vectorized call flow 704 are similar based on the angle 708 between the vectors 702 and 704 being small or approximately zero, which corresponds to a cosine of approximately 1. The data processing system 202 can determine the call flow vector 706 is dissimilar to call flow vectors 702 or 704 based on the angle 710 being large. Thus, the data processing system 202 can determine a cosine similarity for each call flow vector in a cluster, as depicted in FIG. 6. Further, the data processing system 202 can use the cosine similarity function to perform an additional check on a clustered new call flow vector to determine whether the call flow vector belongs in the cluster. For example, the data processing system 202 can determine the cosine similarity between the new call flow vector and each of the instances of call flow vectors in the cluster (e.g., 606), and then determine the mean cosine similarity for the new call flow with respect to each of the instances in the cluster 606. If the mean cosine similarity for the new call flow is greater than the mean for the category (e.g., 0.97 for the first category 622 as illustrated in FIG. 6).

Thus, the data processing system can classify, using a k-means clustering function (e.g., Function 1), call flows into the one or more clusters (e.g., 606-610) to identify call flows of with common characteristics. The data processing system 202 can perform an additional check on a new call flow based on a cosine similarity of each call flow to a baseline vector of each of the one or more clusters to classify the call flow into the cluster. If the cosine similarity of the new call flow is greater than or equal to the mean for the category, the data processing system 202 can classify the new call flow as part of the cluster. If the cosine similarity of the new cluster is less than the mean for the category, then the data processing system 202 can determine the call flow does not belong to the cluster.

Upon classifying the call flow in the anomalous cluster, the data processing system 202 can identify which one or more modules of the plurality of modules are operating anomalously. For example, the cluster can indicate which module is anomalous or associated with the technical issue. For example, if the cluster is associated with a high timeout occurrences based on a timeout related keyword in the dictionary 224, then the data processing system 202 can determine that the timeout value for a module can be too low (e.g., a TCP window size), and then increase the TCP window size to reduce the number of occurrences of the timeout.

Figure 8:
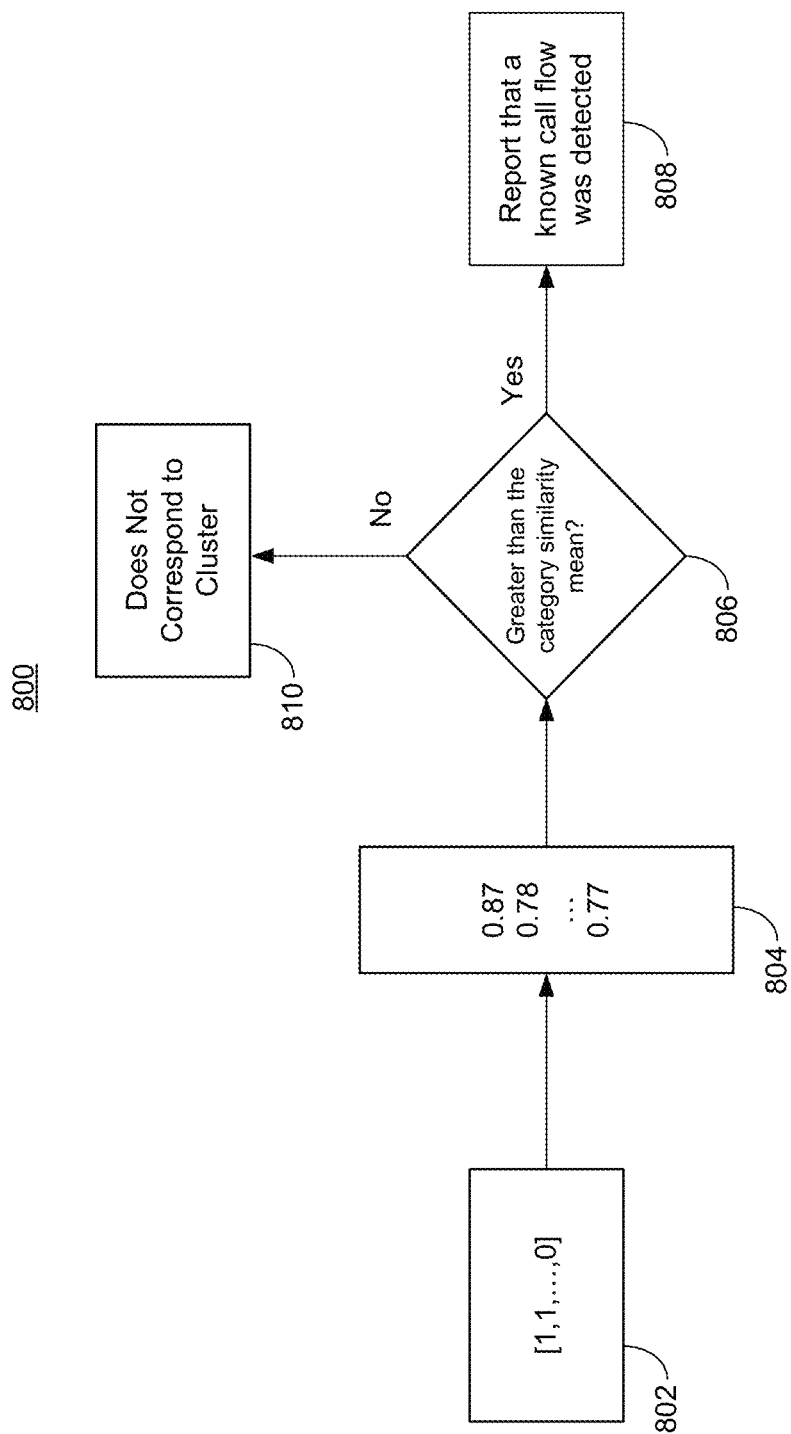
FIG. 8 depicts an example process to detect anomalous call flows, in accordance with implementations.

FIG. 8 depicts an example process to detect anomalous call flows, in accordance with implementations. The operational flow 800 can be performed by one or more component or system depicted in FIG. 1A, 1B or 2, including, for example, the data processing system 202. The data processing system can use the process 800 to determine whether a reconstructed call flow or raw log files correspond to a known call flow present in the set of the predefined baseline vectors. At 802, the data processing system converts the input log file to a vectorized form. For example, the data processing system can use a dictionary generated using a bag of words technique to include keywords to determine a count of a number of occurrences of the keywords. At 804, the data processing system can determine the cosine similarities of the input 802 against a set of predefined baseline vectors for a cluster. At 806, the data processing system can determine if one of the cosine similarities is greater than or equal to the mean associated with a category. If one of the cosine similarities 804 exceeds the mean of the category, then the data processing system can proceed to 808 to report that a known call flow was detected. This can refer to a call flow being classified in a cluster or group that can correspond to an anomaly, erroneous operation, or other important category. If, however, the cosine similarities 804 are less than the mean for the category, then the data processing system can proceed to 810 and determine that the call flow does not correspond to a known or predetermined category.

Figure 9:
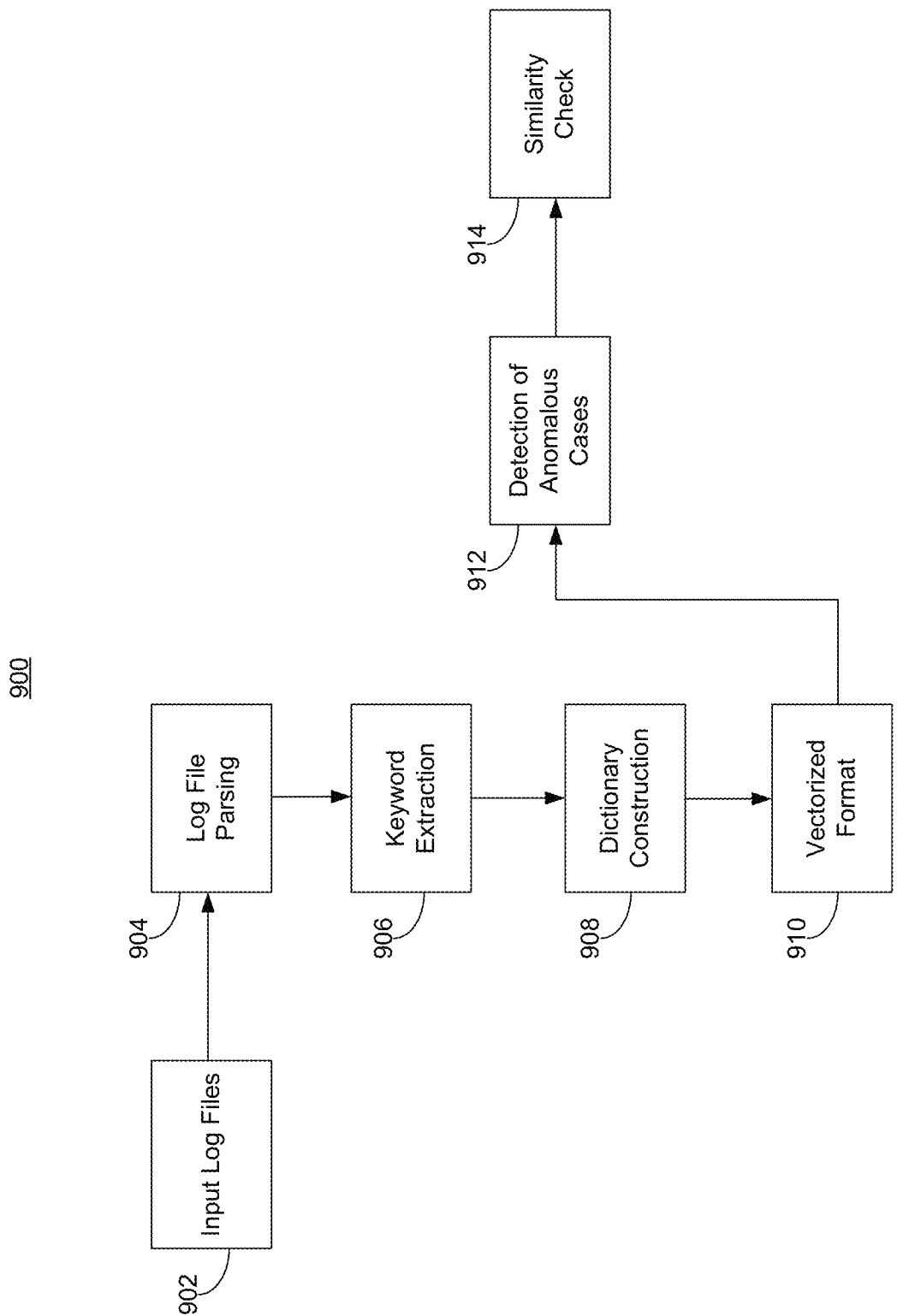
FIG. 9 depicts an example method of detecting anomalous call flows, in accordance with implementations.

FIG. 9 depicts an example method of detecting anomalous call flows, in accordance with implementations. The operational flow 900 can be performed by one or more component or system depicted in FIG. 1A, 1B or 2, including, for example, the data processing system 202. At 902, the data processing system can receive input log files. The data processing system can take the log files of call flows as input, and reconstruct the call flows. At 904, the data processing system can parse the log files. The data processing system can parse the log files to identify keywords in the log files. At 906, the data processing system can extract keywords from the log files. The data processing system can use a bag of words technique to extract the keywords from the log files. At 908, the data processing system can construct a dictionary based on identifying keywords for the type of call flows (e.g., containing errors/normal). At 910, the data processing system can convert the input reconstructed log files into a vectorized form.

At 912, the data processing system can cluster the call flows into one or more clusters, such as an anomalous cluster or nominal cluster. For example, after the clustering procedure, two clusters can be generated: one for the call flows that were executed normally and one for those that produced errors. At 914, the data processing system can perform a similarity check. For example, the data processing system can perform the similarity check on the call flows that are clustered in the anomalous cluster to determine with a higher likelihood that the call flow is anomalous. The data processing system can examine the anomalous cases (from the corresponding cluster) with the goal of identifying them as one of a set of predefined baseline vectors (e.g., corresponding to some frequently occurring, error-prone call flows). The data processing system can perform the similarity check using a cosine similarity function.

Figure 10:
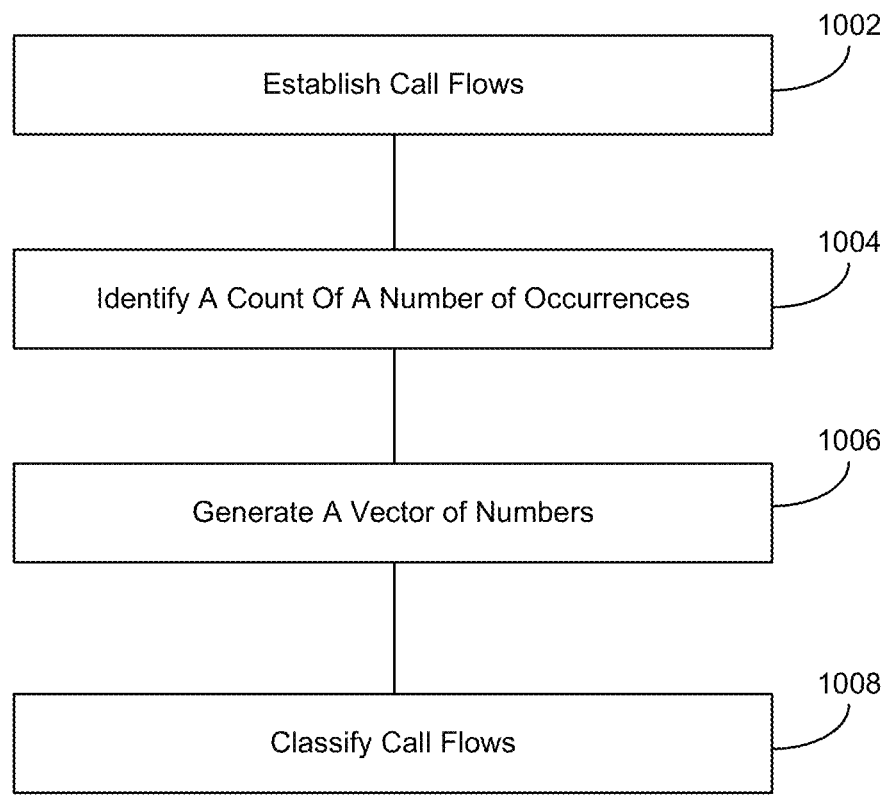
FIG. 10 depicts an example method of detecting anomalous call flows, in accordance with implementations.

FIG. 10 depicts an example method of detecting anomalous call flows, in accordance with implementations. The operational flow 1000 can be performed by one or more component or system depicted in FIG. 1A, 1B or 2, including, for example, the data processing system. In brief overview, the method can include the data processing system establishing call flows at 1002. At 1004, the data processing system can identify a count of a number of occurrences of keywords in the call flows. At 1006, the data processing system can generate a vector of numbers for the call flows. At 1008, the data processing system can classify the call flows.

Still referring to FIG. 10, and in further detail, the method 1000 can include the data processing system establishing call flows at 1002. The data processing system can receive log files for calls that flowed through multiple modules provided by various components in a network topology. The data processing system can use information extracted from the one or more log files to establish or reconstruct a call flow. For example, the data processing system can use a transaction identifier or other unique identifier associated with the log files to identify log files that correspond to a same call flow. The data processing system can further identify a timestamp in the log files to sort the log files. The data processing system can further identify a module name in the log files to identify through which modules the call flowed. Thus, the data processing system can establish or reconstruct the call flow using the log files. In some cases, the data processing system can generate a visual display of the reconstructed log file, as depicted in FIG. 3.

At 1004, the data processing system can identify a count of a number of occurrences of keywords in the call flows. The data processing system can identify a count of a number of occurrences of one or more keywords in information of each call flow of the plurality of call flows. The data processing system can use a dictionary with keywords that facilitate classifying call flows as anomalous or normal. The data processing system can generate the dictionary using a bag of words technique to extract keywords from the call flows. For example, the data processing system can establish the dictionary of keywords for each call flow of the plurality of call flows based on common keywords of the call flow. The common words can be identified or determined using a bag of words technique. The bag of words model can represent text (e.g., the text of the log file for the call flow) as a bag (e.g., a multiset) of the words in the log file, disregarding grammar and even word order but keeping multiplicity. The bag of words model can indicate the frequency of occurrence of each word. From the bag of words model, the data processing system can identify a dictionary of relevant keywords for classification, and then generate the vector of number with the keywords from the dictionary. The vector of numbers can identify the count of the number of occurrences for each keyword in the dictionary of keywords for the corresponding call flow.

At 1006, the data processing system can generate a vector of numbers for the call flows. The data processing system can generate a vector of numbers for each call flow based at least on the count for the one or more keywords for that call flow. For example, the data processing system can convert alpha numeric data from the extracted information for each call flow to a numeric representation of each call flow in the form of the vector of numbers. The vector of numbers can indicate the number of occurrences of each keyword in the dictionary used for the call flow.

At 1008, the data processing system can classify the call flows. The data processing system can classify, using the vector of numbers for each call flow, each call flow into one or more clusters that indicate whether an operation of the call flow is anomalous. The data processing system can classify the call flows using a k-means clustering function. Using the k-means clustering function, each call flow can be classified in two or more clusters. The two or more clusters can include an anomalous cluster and a normal call cluster. The call flows clustered together can have common characteristics, which can be indicated by the vector of numbers of the call flow.

The data processing system can perform an additional check on the call flow once clustered to determine that the clustering was correct. For example, the data processing system can use a cosine similarity of each call flow to a baseline vector of each of the one or more clusters. The data processing system can identify a mean cosine similarity for each of the one or more clusters. The data processing system can determine cosine similarity for a call flow of the plurality of call flows with each of the one or more clusters. The data processing system can classify the call flow into a cluster of the one or more clusters based on the cosine similarity for the call flow with the cluster being greater than or equal to the mean cosine similarity for the cluster.

Based on the cluster, the data processing system can determine which module caused the anomalous behavior. For example, if the cluster is associated with timeouts, or other types of errors, the data processing system can determine which module can cause that type of error. For example, if the error is associated with a timeout, the data processing system can determine the module that contains a TCP window size value, and then push a configuration update to the module to increase the TCP window size, thereby reducing the occurrences of this error in subsequent call flows.

The above-mentioned elements or entities may be implemented in hardware, or a combination of hardware and software, in one or more embodiments. Components may be implemented using hardware or a combination of hardware or software detailed above in connection with FIGS. 1A-1B. For instance, these elements or entities can include any application, program, library, script, task, service, process or any type and form of executable instructions executing on hardware of a device. The hardware includes circuitry such as one or more processors in one or more embodiments.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

It will be further understood that various changes in the details, materials, and arrangements of the parts that have been described and illustrated herein may be made by those skilled in the art without departing from the scope of the following claims.

What is claimed is:

1. A method comprising:
   establishing, by one or more processors using information extracted from a log file, a plurality of call flows, each of the plurality of call flows identifying information from the log file of a call flowing through a plurality of modules in accessing an application, the one or more processors extracting the information from the log file for each call flow of the plurality of call flows based at least on a timestamp, each call flow having a common unique transaction identifier and information from the log file for each call flow identified by the common unique transaction identifier;
   identifying, by the one or more processors, a count of a number of occurrences of one or more natural language keywords from the log file in information of each call flow of the plurality of call flows;
   generate, by the one or more processors, a vector of numbers for each call flow based at least on the count for the one or more keywords for that call flow; and
   classifying, by the one or more processors using the vector of numbers for each call flow, each call flow into one or more clusters, each of the one or more clusters identifying which modules are performing better than other modules of the plurality of modules; and
   updating, by the one or more processors, a configuration of one or more of the other modules in accessing the application based at least on the one or more clusters.

2. The method of claim 1, further comprising sorting, by the one or more processors, identifiers of modules for each call flow by the timestamps for each unique transaction identifier.

3. The method of claim 1, further comprising converting, by the one or more processors, alpha numeric data from the extracted information for each call flow to a numeric representation of each call flow in the form of the vector of numbers.

4. The method of claim 1, further comprising:
   establishing a dictionary of keywords for each call flow of the plurality of call flows based on common keywords of the call flow; and
   identifying the count of the number of occurrences for each keyword in the dictionary of keywords for the corresponding call flow.

5. The method of claim 1, further comprising classifying, by the one or more processors, using a k-means clustering function each call flow of the plurality of call flows into the one or more clusters to identify call flows of the plurality of call flows with common characteristics.

6. The method of claim 1, further comprising classifying, by the one or more processors, each call flow into a cluster of the one or more clusters based on a cosine similarity of each call flow to a baseline vector of each of the one or more clusters.

7. The method of claim 1, further comprising:
identifying, by the one or more processors, a mean cosine similarity for each of the one or more clusters;
determining, by the one or more processors, a cosine similarity for a call flow of the plurality of call flows with each of the one or more clusters; and
classifying, by the one or more processors, the call flow into a cluster of the one or more clusters based on the cosine similarity for the call flow with the cluster being greater than or equal to the mean cosine similarity for the cluster.

8. The method of claim 1, further comprising identifying, by the one or more processors based at least on the one or more clusters, which one or more modules of the plurality of modules are operating anomalously.

9. A system to identify anomalous calls flowing through modules, comprising:
a device comprising one or more processors coupled to memory, the device to:
establish, using information extracted from a log file, a plurality of call flows, each of the plurality of call flows identifying information from the log file of a call flowing through a plurality of modules in accessing an application, wherein the information is extracted from the log file for each call flow of the plurality of call flows based at least on a timestamp, each call flow having a common unique transaction identifier and information from the log file for each call flow identified by the common unique transaction identifier;
identify a count of a number of occurrences of one or more natural language keywords from the log file in information of each call flow of the plurality of call flows;
generate a vector of numbers for each call flow based at least on the count for the one or more keywords for that call flow;
classify, using the vector of numbers for each call flow, each call flow into one or more clusters that indicate whether an operation of the call flow is anomalous; and
update a configuration of one or more of the other modules in accessing the application based at least on the one or more clusters.

10. The system of claim 9, wherein the device is further configured to sort identifiers of modules for each call flow by the timestamps for each unique transaction identifier.

11. The system of claim 9, wherein the device is further configured to convert alpha numeric data from the extracted information for each call flow to a numeric representation of each call flow in the form of the vector of numbers.

12. The system of claim 9, wherein the device is further configured to:
establish a dictionary of keywords for each call flow of the plurality of call flows based on common keywords of the call flow; and
identify the count of the number of occurrences for each keyword in the dictionary of keywords for the corresponding call flow.

13. The system of claim 9, wherein the device is further configured to classify, using a k-means clustering function, each call flow of the plurality of call flows into the one or more clusters to identify call flows of the plurality of call flows with common characteristics.

14. The system of claim 9, wherein the device is further configured to classify each call flow into a cluster of the one or more clusters based on a cosine similarity of each call flow to a baseline vector of each of the one or more clusters.

15. The system of claim 9, wherein the device is further configured to:
identify a mean cosine similarity for each of the one or more clusters;
determine cosine similarity for a call flow of the plurality of call flows with each of the one or more clusters; and
classify the call flow into a cluster of the one or more clusters based on the cosine similarity for the call flow with the cluster being greater than or equal to the mean cosine similarity for the cluster.

16. The system of claim 9, wherein the device is further configured to identify, based at least on the one or more clusters, which one or more modules of the plurality of modules are operating anomalously.

17. A non-transitory computer readable medium storing instructions that, when executed by one or more processors, cause the one or more processors to identify anomalous calls flowing through modules, the instructions comprising instructions to:
establish, using information extracted from a log file, a plurality of call flows, each of the plurality of call flows identifying information from the log file of a call flowing through a plurality of modules, the information extracted from the log file for each call flow of the plurality of call flows based at least on a timestamp, each call flow having a common unique transaction identifier and information from the log file for each call flow identified by the common unique transaction identifier;
identify a count of a number of occurrences of one or more natural language keywords from the log file in information of each call flow of the plurality of call flows;
generate a vector of numbers for each call flow based at least on the count for the one or more keywords for that call flow;
classify, using the vector of numbers for each call flow, each call flow into one or more clusters that indicate whether an operation of the call flow is anomalous; and
update a configuration of one or more of the other modules in accessing the application based at least on the one or more clusters.

* * * * *